United States Patent [19]

Tisue

[11] 4,133,008
[45] Jan. 2, 1979

[54] AUTOMATIC ILLUMINATION COMPENSATION CIRCUIT

[75] Inventor: James G. Tisue, Mountain View, Calif.

[73] Assignee: Rapicom Inc., Santa Clara, Calif.

[21] Appl. No.: 777,095

[22] Filed: Mar. 14, 1977

[51] Int. Cl.$^2$ .......................... H04N 1/38; H04N 5/19
[52] U.S. Cl. ............................. 358/282; 250/214 AG
[58] Field of Search ............ 250/205, 214 AG, 214 B, 250/214 C, 565; 358/282, 163; 340/146.3 AG

[56] References Cited

U.S. PATENT DOCUMENTS

| | | | |
|---|---|---|---|
| 3,796,866 | 3/1974 | McClellan | 250/205 |
| 3,800,078 | 3/1974 | Cochran et al. | 358/213 |
| 3,872,434 | 3/1975 | Duvall et al. | 340/146.3 AG |
| 3,919,473 | 11/1975 | Cotter | 358/163 |
| 3,928,867 | 12/1975 | Lynch | 358/169 |

Primary Examiner—Robert L. Richardson
Assistant Examiner—Joseph A. Orsino, Jr.
Attorney, Agent, or Firm—Schatzel & Hamrick

[57] ABSTRACT

A compensation circuit for use in a document reproduction system for correcting variations in white level occurring between different documents and due to nonuniformity of the scanning process including a variable voltage gain amplifier for compensatingly modifying the output of an image scanner and having a gain control system which drives the white level amplifier gain to a predetermined level so that the scanner output is made independent of certain well known causes of nonuniformity. The gain control system includes a comparator which compares the amplifier output to a white reference signal, a counter having a start count which may be present and which is incremented when the comparator output indicates that the amplifier output exceeds the reference signal, a memory which is addressed by signals developed by the scanner and which stores the output of the counter at intervals which in effect subdivide each scan line, the stored signals being used to preset the counter at the beginning of each particular scan interval, and a digital-to-analog converter for converting the counter output to a form which can be used to drive the amplifier.

7 Claims, 2 Drawing Figures

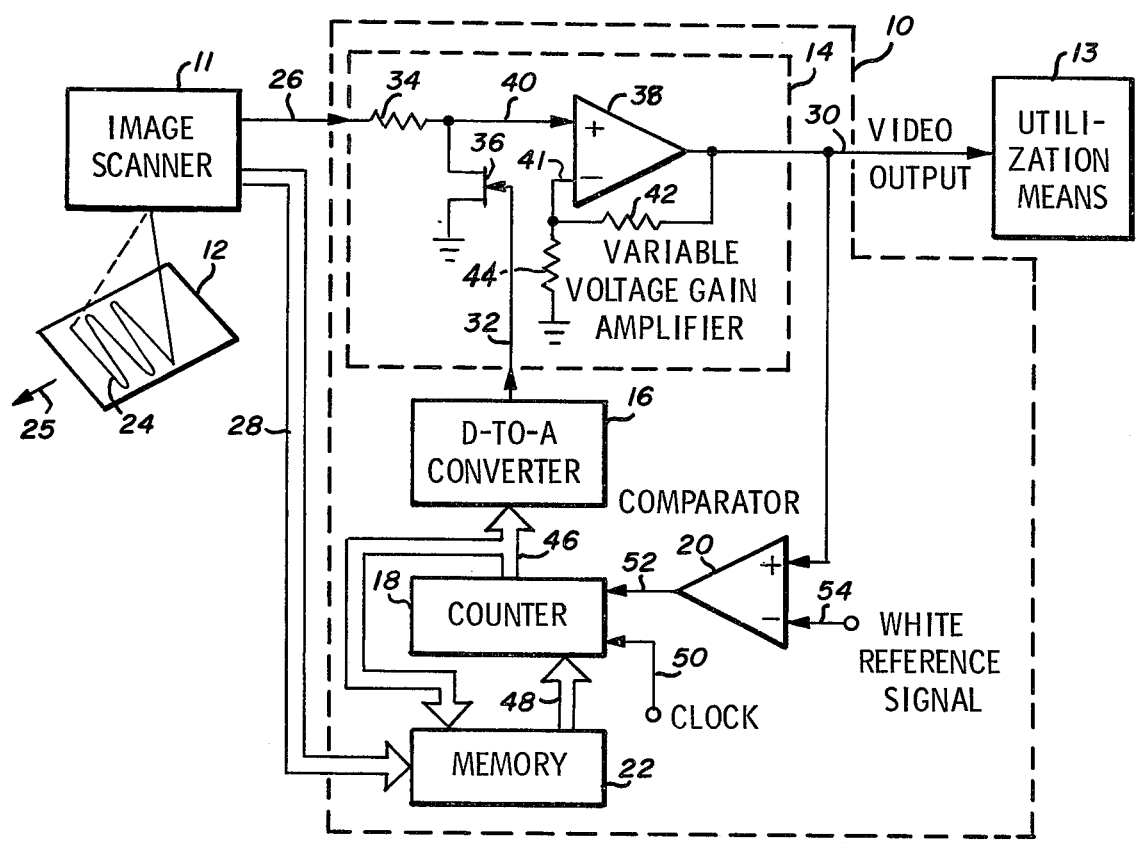
Fig_1

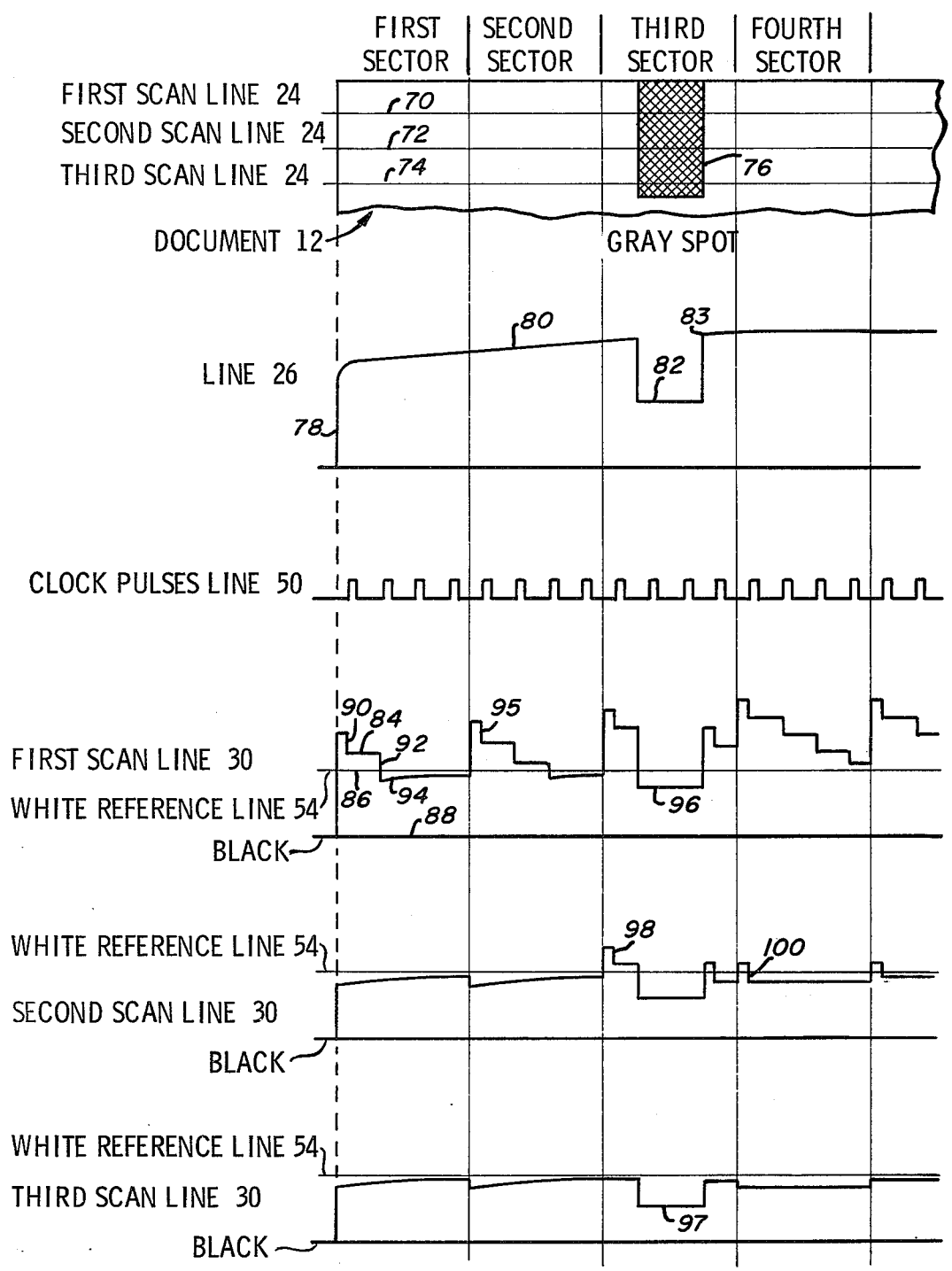
Fig_2

AUTOMATIC ILLUMINATION COMPENSATION CIRCUIT

BACKGROUND OF THE INVENTION

1. Field of the Invention

The present invention relates generally to document reproduction apparatus and more particularly to an improved circuit for use in such an apparatus to provide compensation for variations in the luminosity of documents and nonuniformities in the reproduction scanning apparatus.

2. Description of the Prior Art

Variations in the background level of signals obtained from a document scanner occur both because of variations in the luminosity of different document papers, or colors of the paper, and because of nonuniformities in the scanning system. Typical sources of variation in a scanning system include decreased sensitivity at the document edges because of the increased distance to the illumination source and the increased angle of reflection, variations in the scanner optics, such as vignetting, and aging of the illumination source and photodetector. To avoid the consequences of such variations, white level compensation is usually employed.

One prior art approach filters a portion of the video signal from the scanner in a long time constant circuit, called a white follower. The video signal and the filtered signal are compared in a discriminator which produces an output consisting of the differences in the signals. The resulting signal contains only the rapid signal variations. One difficulty with this approach is that it is unable to reproduce large shaded areas of a document. A second problem is that printing at the edge of shaded areas, such as on an address label, is lost.

A prior art approach to solve the second problem is disclosed in the *IBM Technical Disclosure Bulletin*, Volume 13, No. 11, April 1971. This approach includes a white follower having two time constant configurations. Normally, the regular long time constant configuration is used; however, when black is encountered, the much faster time constant configuration is activated. Although tending to solve the edge distortion problem, this approach tends to aggravate the first mentioned problem.

A system to compensate for gain variations between the different elements of the photodiode array of a scanner is disclosed in the U.S. Patent to McNeil et al, U.S. Pat. No. 3,800,079. This system operates in two modes. In the first mode, a standard is scanned and the difference between the output of each photodiode and a reference is stored. In the second mode the recovered stored difference is added to the reference producing ideally the original diode output. This latter signal is first subtracted from the current output resulting in a representation of the information being scanned. Finally that same signal is divided into the result of the aforementioned operation to generate the calibrated signal. In addition to requiring a complex system having two separate modes of operation, the system calibration is not performed on the document to be copied; thus, the system is unable to compensate for differences in document luminosity. Were calibration attempted on the document to be copied, the system would be unable to differentiate between the background and data levels and would result in an inaccurate calibration.

SUMMARY OF THE PRESENT INVENTION

It is therefore an object of the present invention to provide an automatic illumination compensation circuit which will compensate for variations in document luminosities and system nonuniformities.

Another object of the present invention is to provide an illumination compensation circuit which does not require a separate calibration mode.

A further object is to provide an illumination compensation circuit which will enable the faithful reproduction of large shaded areas of a document.

Briefly, the preferred embodiment of the present invention includes a variable voltage gain amplifier for compensatingly modifying the output of an image scanner and having a gain control system which drives the white level amplifier gain to a predetermined level so that the scanner output is made independent of certain well known causes of nonuniformity. The gain control system includes a comparator which compares the amplifier output to a white reference signal, a counter having a start count which may be preset and which is incremented when the comparator output indicates that the amplifier output exceeds the reference signal, a memory which is addressed by signals developed by the scanner and which stores the output of the counter at intervals which in effect subdivide each scan line, the stored signals being used to preset the counter at the beginning of each particular scan interval, and a digital-to-analog converter for converting the counter output to a form which can be used to drive the amplifier.

An important advantage of the present invention is its ability to provide signal compensation with a simple circuit in a single operating mode.

Another advantage of the present invention is its ability to compensate for white variations while still faithfully reproducing large grey areas of a document.

IN THE DRAWING

FIG. 1 is a block diagram illustrating the principal components of an automatic illumination compensation circuit in accordance with the present invention; and FIG. 2 is a timing diagram used to schematically illustrate operation of the circuit shown in FIG. 1.

DETAILED DESCRIPTION OF THE PREFERRED EMBODIMENT

An automatic illumination compensation circuit for use in a document reproduction system is shown generally at 10 in FIG. 1. The circuit 10 is coupled to the output of an image scanner 11, which is shown scanning a document 12, and is coupled to a utilization means 13 and includes a variable voltage gain amplifier 14, a digital-to-analog converter 16, a counter 18, a comparator 20 and a memory 22. Scanner 11 is any suitable prior art scanning device which generates both video scan data and binary scan position address signals. The scanner used with the preferred embodiment includes an optical device (not shown) such as a reflective surface and lens system for effectively sweeping along a scan line 24 across the face of document 12 and focusing the light from spots along the line onto a photodetector (also not shown). Successive scan lines are effectively shifted in increments down the surface of the document as the document is step-wise advanced in the direction shown by arrow 25. The output of the photodetector, as developed on line 26, is in the form of a video signal representative of variations in the luminosity of the document surface at points along the scan line.

Also generated by the scanner is a clock signal which is linearly related to the point on the scan line then being focused onto the detector. From the clock signal, a binary address signal is developed on five lines 28. The address signal in effect divides the document into strips or sectors, each having a unique address. In the preferred embodiment, 32 such sectors are used. A detailed description of a different scanner and an apparatus for generating a clock signal are disclosed in my earlier U.S. Pat. No. 4,000,368.

Amplifier 14 generates an amplified video signal on an output line 30 that is proportional to the video signal input to the amplifier on line 26. The proportionality, or gain, of the amplifier is a function of an analog gain control signal developed on a line 32. In our embodiment, amplifier 14 includes an operational amplifier 38 having its positive input terminal 40 coupled to the scanner output line 26 through a resistor 34 and its negative input terminal 41 connected to circuit ground through a resistor 44. Operational amplifier 38 also has a feedback resistor 42 coupling its output line 30 to input terminal 41 and combining with resistor 44 to set the operational amplifier gain.

A field effect transistor 36 is also connected between input 40 and circuit ground and has its gate electrode connected to gain control input line 32. Resistor 34 and the transistor form a voltage divider which cause the input signal at 26 to be divided in accordance with the ratio of the resistance of resistor 34 to the source-to-drain impedance of the transistor, which is in turn roughly inversely proportional to the transistor gate voltage input on line 30. The divided signal is then buffered and amplified by amplifier 38.

The dynamic range of amplifier 14 is designed to exceed the range of white level variations the scanner will encounter. In other words, the maximum gain of amplifier 14 must be sufficient to amplify the lowest white level signals, normally occurring at the edges of the darkest document to be copied, to a level greater than the white reference level, and the minimum amplifier gain must be low enough to reduce the highest white level, normally occurring at the center of the lightest document to be copied, to a level less than the white reference level. In operation, as the control voltage on line 32 increases causing the transistor impedance to decrease, the signal level at point 40 is decreased, thus decreasing the gain of amplifier 14. Amplifier 14 may alternatively consist of a commercially available multiplier which has a gain that is proportional to a control signal.

In the preferred embodiment, converter 16 is a commercially available 8-bit digital-to-analog converter which generates an analog output signal on line 32 having an amplitude that is proportional to a binary number signal developed on eight input lines 46. Alternatively, a multiplying D-to-A converter such as a DAC-08 manufactured by Precision Monolithics, Inc., Santa Clara, California, can also be used in place of both amplifier 14 and converter 16 if a suitable resistor is used in series with the converter's input and an operational amplifier is connected in series with the converter's output. The resistor converts the voltage signal from the scanner to a current signal as required by the converter, and the amplifier converts the current output of the converter to a voltage signal as required by the compensation circuit.

Counter 18 is a commercially available device, of 8-bit length having binary preset inputs on eight lines 48, a clock input on a line 50 and an enable input on a line 52. It generates a binary sum output on lines 46. In operation, the binary number on preset lines 48 is loaded into the counter, and the number is made continuously available on output lines 46. When the enable input is high, counter 18 is incremented by each clock pulse input on line 50. No combination of clock and enable inputs will decrement the counter. The clock signal may be provided by either a separate clock device having one or more clock pulses per scanning sector, or the clock signal developed by the scanner itself may be employed. In the preferred embodiment, a clock rate of four clock pulses per sector is used.

Comparator 20 is a commercially available device which generates a high level digital signal on output line 52 when the video input signal level on line 30 exceeds the level of a white reference signal on a line 54. The white reference signal level corresponds to the level to which the white background level signals are to be reduced by the compensation circuit.

In the preferred embodiment, memory 22 is a commercially available 8 × 32 bit device which stores the 8-bit binary numbers on input lines 46 at one of the thirty-two locations addressed by the 5-bit address on input lines 28. The stored number addressed by the signal on lines 28 is present on output lines 48. When scanner 10 begins the initial scan of document 12, all locations of memory 22 are set to zero. As the scanner enters the first sector of scan line 24, the first address on lines 28 is used to index the first memory location in the memory retrieving the binary number, a zero, stored therein. The binary zero is then loaded into counter 18 and appears, still as a binary zero, on the counter output lines 46. D-to-A converter 16 then converts the binary zero to a low level analog control signal which drives variable voltage gain amplifier 14 to the maximum gain condition. Since the borders of most documents are plain, the luminosity should be at its maximum value.

The scanner video output signal on line 26 will thus be amplified by amplifier 14 to produce a signal level on line 30 which exceeds the white reference signal level on line 54 causing the output of comparator 20 to go high. Upon the occurrence of each clock pulse on line 50 while the output of the comparator is high, the counter will be incremented causing the converter to progressively reduce the gain of the amplifier. Incrementing of the counter will continue until either the gain of amplifier 14 is so reduced that the amplified scan signal level no longer exceeds the white reference signal level, or the end of the sector is reached.

At the end of the first sector the sum in the counter at that time is stored in the first memory location, the memory address is incremented by the scanner output on lines 28 and the sum stored in the second memory location is retrieved and set into the counter. This operation then continues for each of the 32 sectors in the first scan line. Following the first scan the document may be advanced and a second scan is made below the first scan. If the document is not advanced, calibration will proceed using only the first line repeated on multiple passes. Complete and accurate calibration may not be completed until the document is moved if data totally fills a scan interval. As the first sector is again encountered, the old sum stored in the first memory location, is retrieved and loaded into the counter and the above-described process is continued for the remainder of the line as well as each subsequent line as the whole document is scanned.

When the amplified video signal level no longer exceeds the reference signal level, and the counter is thus no longer being incremented by clock pulses, the several sum signals stored in the memory 22 represent first approximations of the compensation signals required for each sector. These sums are then continuously used to program amplifier 14 to gain settings appropriate for each sector until a point in a sector having a higher luminosity is encountered and the particular count of that sector is further incremented.

When data is encountered on the face of the document being scanned, the amplified video signal level will drop below the white reference level. This however will have no effect on the counter unless the data is whiter than the background level since the counter is only incremented, not decremented.

A timing diagram which can be used to further illustrate the operation of the compensation circuit is shown in FIG. 2. First, second and third scan lines crossing the top left corner of document 12 are depicted by lines 70, 72, and 74, respectively, and grey spot 76 is shown in the third sector. As mentioned earlier, if the document is not being advanced, the first, second and third scans might correspond to 70. Directly beneath the illustrated document segment the output of scanner 10 on line 26 is shown as increasing rapidly at 78 when the scan crosses from the black background to the edge of the document. As depicted by line 80 the scanner output then gradually increases as the scan moves from the edge towards the center of the document, such increases being caused by the nonuniformities in the scanner. The output then drops to the level 82 as the scan passes the grey spot 76 then returns to the background level at 83 and continues to slowly increase as the scan approaches the center of the document. The corresponding video output of amplifier 14 developed on line 30 is shown at 84 compared with the white reference signal shown at 86. The black signal level is illustrated at 88.

When the amplifier output exceeds the reference signal level, at the occurrence of the next clock pulse the counter will be incremented, thus decrementing the gain of the amplifier as illustrated at points 90 and 92. When the level is equal to or less than the reference level, as shown following the second clock pulse at point 94, the amplifier gain is no longer decremented. The amplifier output again exceeds the reference signal level and is decremented at 95 when a new sector with memory word zero is encountered as the scan crosses spot 76 the video signal level drops below the reference level as shown at 96. During this time no level compensation takes place, but if the spot does not cover all of the sector, as shown here, level compensation will still be accomplished, but at a slower rate than when the spot is absent. Also, it should be noted that although the spot 76 covers part of the first scan the spot will be reproduced, (since, the spot signal level is less than the white reference level at 96) only lighter in shade than following the completion of level compensation (as shown at 97).

During the second scan, level compensation is shown to continue in the third and fourth sectors as shown at 98 and 100. By the third scan, level compensation is shown to be complete, even in the sector containing the grey spot. Throughout the rest of the document no further level compensation will occur unless an area of higher luminosity is encountered.

Although particular values of clock rate, sector width and D-to-A converter resolution are used in the preferred embodiment, other values may also be used. Some of the trade offs include: fast lock-on obtained with high clock rates and coarse converter steps, high compensation resolution obtained with narrow sector widths and fine converter steps; and high noise immunity obtained with low clock rates and wide sector widths. Also, systems using wide sector widths are disrupted less by dark areas near the borders of documents.

In the preferred embodiment the memory is reset for each document. If many copies of the same or similar documents are to be made, the memory could be reset only at the beginning of the series.

Although it is contemplated that after having read the preceding disclosure other alterations and modifications of the present invention will no doubt become apparent to those skilled in the art, it is intended that the following claims be interpreted to cover all such alterations and modifications as fall within the true spirit and scope of the invention.

What is claimed is:

1. An illumination compensation circuit for use in modifying the output of a single mode image scanning device to dynamically compensate for luminosity and optical nonuniformities comprising:

amplifier means responsive to a control signal and operative to modify the white signal level of the sanning device output;

comparator means for comparing the output of said amplifier means to a white reference signal and for generating a comparison signal when the amplifier output exceeds the magnitude of said white reference signal;

counter means responsive to said comparison signal and operative to begin counting at a predetermined rate from an input count and to develop a continuous output count signal until the count is terminated;

memory means having a predetermined number of storage sites each corresponding to particular sectors of the scanning device's scan line, said sites being addressed by signals from the scanning device and operative to store corresponding output count signals received from said counter means, the stored count signals being read out for input to said counter means at the beginning of the scan of the corresponding sector of the next following scan line; and signal converter means for converting said output count signals to control signals suitable for driving said amplifier means.

2. An illumination compensation circuit as recited in claim 1 wherein said amplifier means includes:

a resistor having a first end for receiving said scanning device output and having a second end;
   a drain electrode coupled to said second end of said resistor,
   a source electrode coupled to ground, and
   a gate electrode for receiving said control signal; and
   an amplifier having an input coupled to said second end of said resistor whereby said control signal causes the signal level of said scanning device output to be modified in accordance therewith.

3. An illumination compensation circuit for use in modifying the output of a single mode image scanning device to dynamically compensate for luminosity and optical nonuniformities comprising:

means responsive to a count signal and operative to commensurately modify the amplitude of the signal output by the scanning device so as to develop a compensated scanning signal;

comparator means for comparing said compensated signal to a reference signal and for generating a comparison signal when said compensated signal exceeds the magnitude of said reference signal;

counter means responsive to said comparison signal and operative to begin counting at a predetermined rate from an input count and to develop a continuous output count signal until the count is terminated; and memory means having a predetermined number of storage sites, each corresponding to particular sectors of a line scanned by the scanning device, said sites being addressed by signals from the scanning device and operative to store corresponding output count signals received from said counter means, the stored count signals being read out for input to said counter means at the beginning of the scan of the corresponding sector of the next following scan line.

4. An illumination compensation circuit as recited in claim 3 wherein said means responsive to a count signal includes a digital-to-analog converter which converts said output count signal into an analog voltage signal and a variable voltage gain amplifier which responds to said analog signal.

5. An illumination compensation circuit as recited in claim 4 wherein said variable voltage gain amplifier includes:

a resistor having a first end for receiving said scanning device output and having a second end;

a field effect transistor including
 a drain electrode coupled to said second end of said resistor,
 a source electrode coupled to ground, and
 a gate electrode for receiving said control signal; and an operational amplifier having an input coupled to said second end of said resistor whereby said analog voltage signal causes the signal level of said scanning device output to be modified in accordance therewith.

6. In a facsimile reproduction system including an image scanning device for developing from a single scan a video signal containing information relating to a scanned document, an illumination compensation circuit for dynamically modifying the video signal to compensate for luminosity and optical nonuniformities, and a means for utilizing the compensated video signal, an improved illumination compensation circuit comprising:

means responsive to a count signal and operative to commensurately modify the amplitude of the video signal output by the scanning device so as to develop a compensated video signal;

comparator means for comparing said compensated signal to a reference signal and for generating a comparison signal when said compensated signal exceeds the magnitude of said reference signal;

counter means responsive to said comparison signal and operative to count at a predetermined rate beginning with a particular input count and to develop an output count signal; and memory means having a predetermined number of storage sites, each corresponding to particular sectors of line scanned by the scanning device, said sites being addressed by signals from the scanning device and operative to store corresponding output count signals received from said counter means, the stored count signals later being read out and input to said counter means at the beginning of the scan of the corresponding sector of the next following scan line.

7. An illumination compensation circuit as recited in claim 6 wherein said means responsive to a count signal includes a digital-to-analog converter which converts said output count signal into an analog voltage signal and a variable voltage gain amplifier which responds to said analog signal.

* * * * *